United States Patent
Dobbins et al.

(10) Patent No.: US 7,627,444 B2
(45) Date of Patent: Dec. 1, 2009

(54) METHODS, SYSTEMS, AND COMPUTER-READABLE MEDIA FOR FACILITY INTEGRITY TESTING

(75) Inventors: Anthony Scott Dobbins, Rainbow City, AL (US); Murray E. Nuckols, Birmingham, AL (US); Linda A. Stephens, Riverside, AL (US)

(73) Assignee: AT&T Intellectual Property I, LP, Bedminster, NJ (US)

( * ) Notice: Subject to any disclaimer, the term of this patent is extended or adjusted under 35 U.S.C. 154(b) by 289 days.

(21) Appl. No.: 11/835,532

(22) Filed: Aug. 8, 2007

(65) Prior Publication Data

US 2009/0041204 A1    Feb. 12, 2009

(51) Int. Cl.
*H04M 3/10*    (2006.01)
(52) U.S. Cl. .............. 702/82; 379/9.02; 379/9.03; 379/9.04; 379/32.01; 379/9; 705/1; 705/5; 705/7; 705/8; 705/9; 370/216; 719/318; 707/1; 707/104.1; 707/7
(58) Field of Classification Search ............. 702/82; 379/29.01, 9.02, 9.03, 9.04, 32.01, 224, 14, 379/9; 445/423; 705/1, 7, 8, 9, 5; 370/216, 370/241, 242, 252; 719/318; 707/5, E17.014, 707/1, 104.1, 10, 201; 706/14, 10
See application file for complete search history.

(56) References Cited

U.S. PATENT DOCUMENTS

| | | | |
|---|---|---|---|
| 6,219,648 B1* | 4/2001 | Jones et al. | 705/8 |
| 6,763,333 B2* | 7/2004 | Jones et al. | 705/8 |
| 7,111,318 B2* | 9/2006 | Vitale et al. | 725/107 |
| 7,225,139 B1* | 5/2007 | Tidwell et al. | 705/8 |
| 7,289,605 B1* | 10/2007 | Jean et al. | 379/32.01 |
| 7,366,731 B2* | 4/2008 | Lewis et al. | 707/104.1 |
| 2001/0001143 A1* | 5/2001 | Jones et al. | 705/1 |
| 2004/0062359 A1* | 4/2004 | Jones et al. | 379/1.01 |
| 2004/0210469 A1* | 10/2004 | Jones et al. | 705/8 |
| 2007/0100782 A1* | 5/2007 | Reed et al. | 707/1 |
| 2007/0116185 A1* | 5/2007 | Savoor et al. | 379/9 |
| 2008/0155564 A1* | 6/2008 | Shcherbina et al. | 719/318 |
| 2008/0181099 A1* | 7/2008 | Torab et al. | 370/216 |
| 2008/0195614 A1* | 8/2008 | Lutz et al. | 707/7 |

* cited by examiner

*Primary Examiner*—Carol S Tsai
(74) *Attorney, Agent, or Firm*—Hope Baldauff Hartman LLC

(57) ABSTRACT

Methods, systems, and computer-readable media provide for facility integrity testing. According to embodiments, a method for populating a watch list with circuits of a communications network to be monitored for repeat failures is provided. According to the method, a trouble ticket associated with one of the circuits and a trouble code and analysis code (TC/AC) combination associated with the trouble ticket is retrieved. Whether the trouble ticket meets a watch list criterion is determined. In response to determining that the trouble ticket meets the watch list criterion, the trouble ticket and the TC/AC combination are added to the watch list.

20 Claims, 4 Drawing Sheets

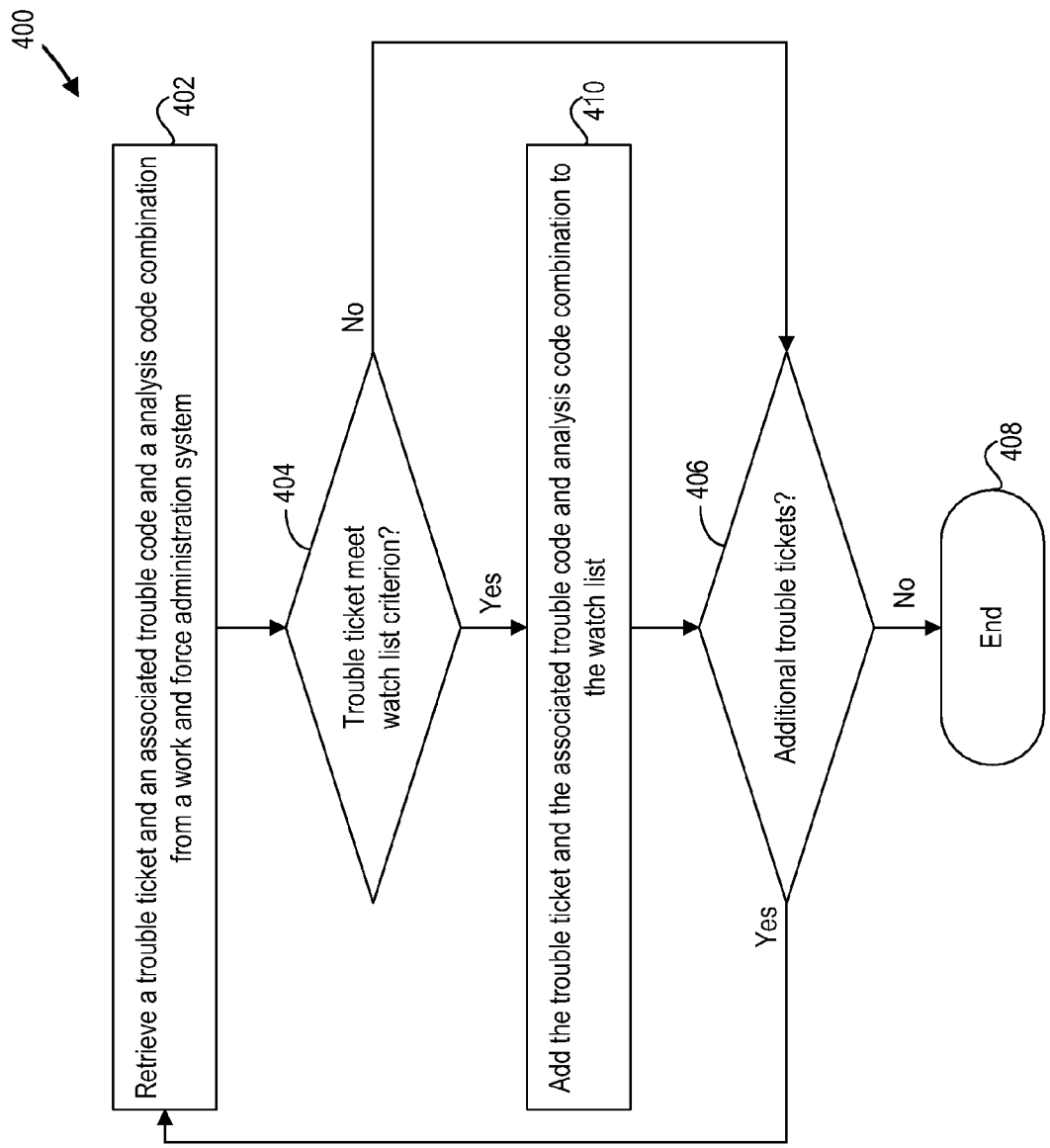

METHODS, SYSTEMS, AND COMPUTER-READABLE MEDIA FOR FACILITY INTEGRITY TESTING

TECHNICAL FIELD

This application relates generally to the field of facility integrity. More specifically, the disclosure provided herein relates to the field of facility integrity testing.

BACKGROUND

Circuit failures may affect the quality of services, such as telecommunications services, provided to customers and other end users. After a circuit failure is detected, a trouble ticket may be opened and a trouble technician may be assigned to resolve the circuit failure. In some instances, even after the circuit failure is reportedly resolved, the circuit may fail again. Such repeat circuit failures may indicate problems with respect to a copper plant or other facility. In particular, about sixty percent of repeat circuit failures may be a result of problems or failure at the copper plant. These repeat failures commonly occur within about seven days of the first failure.

Promptly detecting repeat circuit failures may enable a service provider to resolve the problems or failure at the copper plant/facility before the customer experiences or notices any service-related problems. After the detection of the first failure of a circuit, an information ticket may be opened, and an information technician may be assigned to manually monitor the circuit. For example, the technician may access a performance monitoring ("PM") platform which provides a performance quality value ("PQV") indicating the performance of the circuit. The PM platform may include an integrated network controller ("INC"). The technician may access the PM platform at regular intervals, such as every hour, for a given time frame, such as two weeks. By monitoring the PQV of the circuit over the given time frame, the technician may proactively determine whether repeat circuit failures are occurring, and thus, whether the copper plant/facility is experiencing problems or a failure. However, assigning information technicians to monitor information tickets may be labor-intensive, time-consuming, and inefficient.

SUMMARY

Embodiments of the disclosure presented herein include methods, systems, and computer-readable media for facility integrity testing. According to one aspect, a method for populating a watch list with circuits of a communications network to be monitored for repeat failures is provided. According to the method, a trouble ticket associated with one of the circuits and a trouble code and analysis code (TC/AC) combination associated with the trouble ticket is retrieved. Whether the trouble ticket meets a watch list criterion is determined. In response to determining that the trouble ticket meets the watch list criterion, the trouble ticket and the TC/AC combination are added to the watch list.

According to another aspect, a system for populating a watch list with circuits of a communications network to be monitored for repeat failures is provided. The system includes a memory and a processor functionally coupled to the memory. The memory stores a program containing code for populating a watch list with circuits to be monitored for repeat failures. The processor is responsive to computer-executable instructions contained in the program and operative to retrieve a trouble ticket associated with one of the circuits and a trouble code and analysis code (TC/AC) combination associated with the trouble ticket, determine whether the trouble ticket meets a watch list criterion, and in response to determining that the trouble ticket meets the watch list criterion, add the trouble ticket and the TC/AC combination to the watch list.

According to yet another aspect, a computer-readable medium having instructions stored thereon for execution by a processor to perform a method for populating a watch list with circuits of a communications network to be monitored for repeat failures is provided. According to the method, a trouble ticket associated with one of the circuits and a trouble code and analysis code (TC/AC) combination associated with the trouble ticket is retrieved. Whether the trouble ticket meets a watch list criterion is determined. In response to determining that the trouble ticket meets the watch list criterion, the trouble ticket and the TC/AC combination are added to the watch list.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIG. 4 a flow diagram illustrating a method for populating the watch list with the trouble ticket and the associated TC/AC combination, according to exemplary embodiments.

DETAILED DESCRIPTION

The following detailed description is directed to methods, systems, and computer-readable media for determining a plurality of turfs from where to reallocate a workforce to a given turf. In the following detailed description, references are made to the accompanying drawings that form a part hereof, and which are shown by way of illustration specific embodiments or examples.

Figure 1:
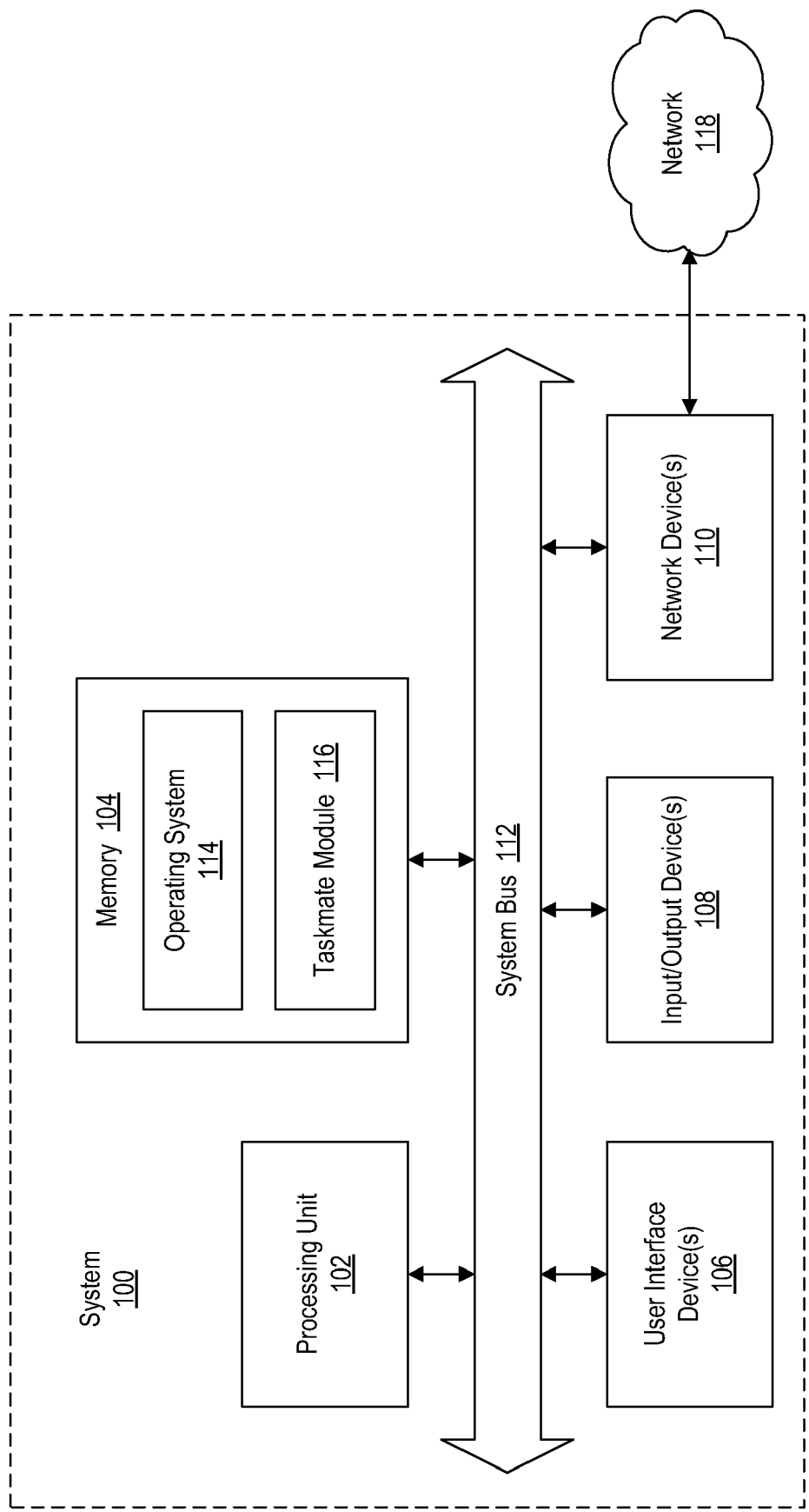
FIG. 1 is a block diagram illustrating a computer configured to populate a watch list with circuits to be monitored for repeat failures, in accordance with exemplary embodiments.

Embodiments described herein provide for facility integrity testing. In particular, a taskmate module, such as a taskmate module 116 shown in FIG. 1, is provided for populating a work list with circuits to be monitored for repeat failures. According to exemplary embodiments and with reference to FIG. 2, the taskmate module 116 polls a work and force administration ("WFA") system, such as a WFA system 204 for circuits that meet a watch list criterion. Each circuit may be associated with a trouble ticket, such as a trouble ticket 202, and a trouble code and analysis code ("TC/AC") combination, such as a TC/AC combination 208. The taskmate module 116 may populate a watch list with circuits that meet a watch list criterion.

A service provider utilizing the watch list may access a performance monitoring ("PM") of circuits associated with the watch list at a given interval to determine whether the circuits are experiencing any problems or a failure. By automatically populating the watch list with circuits and monitoring those circuits, information technicians may no longer be needed to manually access the PM of the circuits, resulting in a significant reduction in labor as well as an increase in efficiency.

Referring now to the drawings, it is to be understood that like numerals represent like elements through the several figures, and that not all components and/or steps described and illustrated with reference to the figures are required for all embodiments. FIG. 1 and the following discussion are intended to provide a brief, general description of a computer system 100 in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 1 is a block diagram illustrating the computer system 100 configured to populate a watch list with circuits to be monitored for repeat failures, in accordance with exemplary embodiments. The computer system 100 includes a processing unit 102, a memory 104, one or more user interface devices 106, one or more input/output ("I/O") devices 108, and one or more network devices 110, each of which is operatively connected to a system bus 112. The bus 112 enables bi-directional communication between the processing unit 102, the memory 104, the user interface devices 106, the I/O devices 108, and the network devices 110. Examples of the computer system 100 include, but are not limited to, computers, servers, personal digital assistants, cellular phones, or any suitable computing devices.

The processing unit 102 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 104 communicates with the processing unit 102 via the system bus 112. In one embodiment, memory 104 is operatively connected to a memory controller (not shown) that enables communication with the processing unit 102 via the system bus 112. The memory 104 includes an operating system 114 and the taskmate module 116, according to exemplary embodiments. Examples of operating systems, such as the operating system 114, include, but are not limited to, WINDOWS operating system from MICROSOFT CORPORATION, LINUX operating system, and FREEBSD operating system. In one embodiment, the taskmate module 116 is embodied in computer-readable media containing instructions that, when executed by the processing unit 102, performs a method for populating a watch list with circuits to be monitored for repeat failures, as described in greater detail below. According to further embodiments, the taskmate module 116 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 100.

The user interface devices 106 may include one or more devices with which a user accesses the computer system 100. The user interface devices 106 may include, but are not limited to, computers, servers, personal digital assistants, cellular phones, or any suitable computing devices. The I/O devices 108 enable a user to interface with the taskmate module 116. In one embodiment, the I/O devices 108 are operatively connected to an I/O controller (not shown) that enables communication with the processing unit 102 via the system bus 112. The I/O devices 108 may include one or more input devices, such as, but not limited to, a keyboard, a mouse, or an electronic stylus. Further, the I/O devices 108 may include one or more output devices, such as, but not limited to, a display screen or a printer.

The network devices 110 enable the computer system 100 to communicate with other networks or remote systems via a network 118. Examples of network devices 110 may include, but are not limited to, a modem, a radio frequency ("RF") or infrared ("IR") transceiver, a telephonic interface, a bridge, a router, or a network card. The network 118 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 118 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 2:
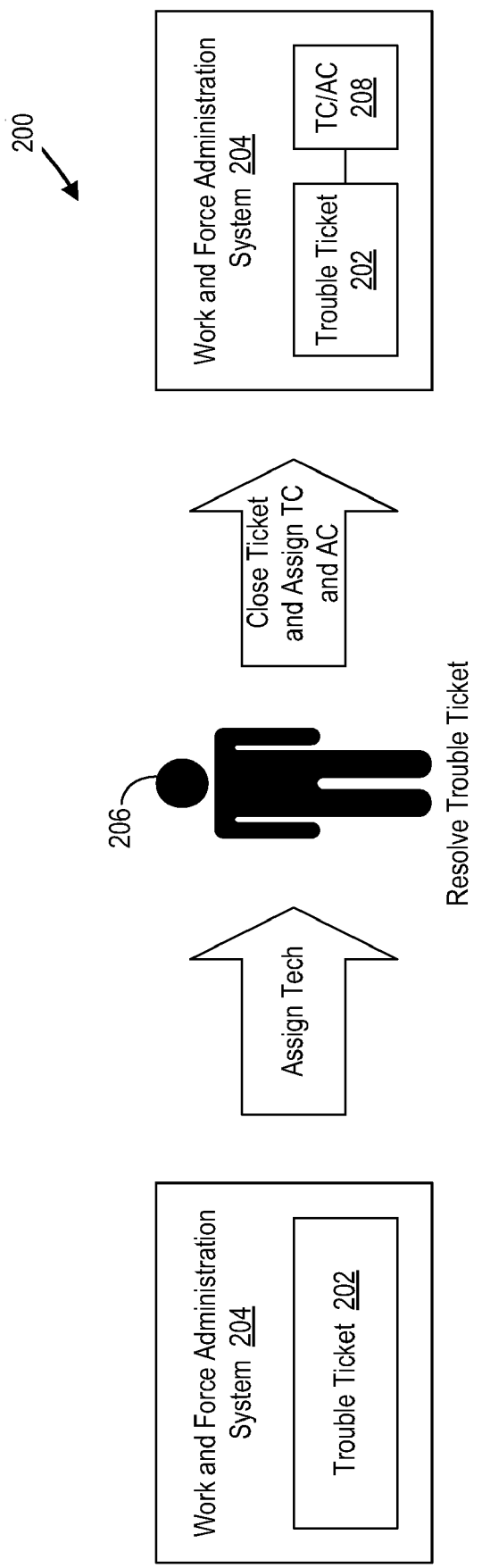
FIG. 2 is a high-level diagram illustrating an exemplary circuit failure sequence.

FIG. 2 is a high-level diagram illustrating an exemplary circuit failure sequence 200. According to the circuit failure sequence 200, the trouble ticket 202 is opened in the work and force administration ("WFA") system 204 in response to the detection of a failure of a particular circuit. For example, the trouble ticket 202 may be opened in response to a customer or other end user notifying a service provider of a service interruption. In response to the trouble ticket 202 being opened, a technician 206 is assigned to resolve the trouble ticket 202, according to one embodiment. After the technician 206 has resolved the failed circuit associated with the trouble ticket 202, the technician 206 may close the trouble ticket 202 and assign a trouble code ("TC") and an analysis code ("AC") (hereinafter referred to as the TC/AC combination 208) to the closed trouble ticket 202. The TC/AC combination 208 may be stored in the WFA system 204 along with the trouble ticket 202. In one embodiment, the TC is a numeric code that identifies the trouble resolved by the technician 206, and the AC is a numeric code that identifies the work performed by the technician 206 to resolve the trouble identified by the TC.

Figure 3:
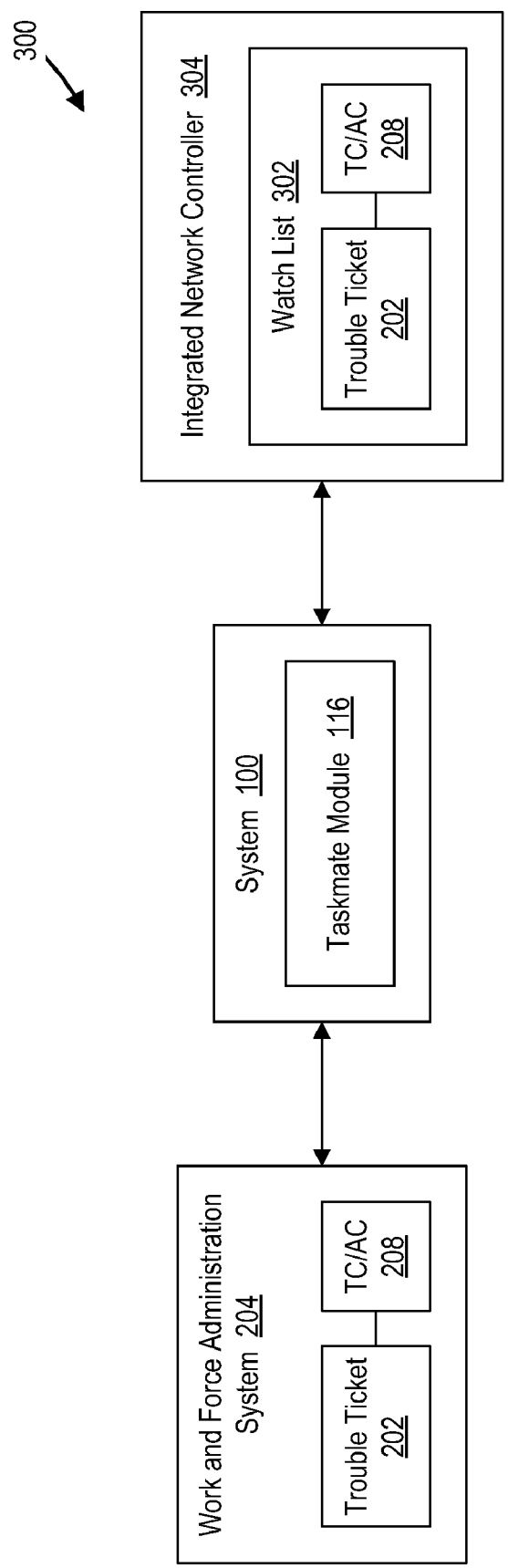
FIG. 3 is a block diagram illustrating a system for populating the watch list with a trouble ticket and an associated trouble code and analysis code ("TC/AC") combination, in accordance with exemplary embodiments.

FIG. 3 is a block diagram illustrating a system 300 for populating a watch list 302 with the trouble ticket 202 and the associated TC/AC combination 208, in accordance with exemplary embodiments. In one embodiment, the watch list 302 is a database included within an integrated network controller 304. As described in greater detail below with respect to FIG. 4, the taskmate module 116 may select the trouble ticket 202 from the WFA system 204 based on the TC/AC combination 208 associated with the trouble ticket 202. The taskmate module 116 may populate the watch list 302 with the selected trouble ticket 202 and the associated TC/AC combination 208.

FIG. 4 is a flow diagram illustrating a method 400 for populating the watch list 302 with the trouble ticket 202 and the associated TC/AC combination 208, according to exemplary embodiments. Referring to FIGS. 3 and 4, the taskmate module 116 retrieves (at 402) a trouble ticket, such as the trouble ticket 202, and an associated TC/AC combination, such as the TC/AC combination 208, from the WFA system 204. In response to retrieving the trouble ticket 202 and the associated TC/AC combination 208, the taskmate module 116 determines (at 404) whether the trouble ticket 202 meets a watch list criterion. In one embodiment, the watch list criterion is based on the TC/AC combination 208. For example, certain TC/AC combinations 208 may indicate that a copper plant/facility failure is more likely than other TC/AC combinations 208. It should be appreciated by those skilled in the art that any criterion may be used to determine which trouble tickets 202 are likely associated with repeat circuit failures and should be included on the watch list 302.

If the trouble ticket 202 does not meet the watch list criterion, then the taskmate module 116 determines (at 406) whether the WFA system 204 includes any other trouble tickets 202. If the WFA system 204 includes other trouble tickets 202, then the taskmate module 116 retrieves (at 402) another trouble ticket 202 and the associated TC/AC combination 208 from the WFA system 204. If the WFA system 204 does not include other trouble tickets 202, then the method 400 terminates (at 408).

If the trouble ticket 202 meets the watch list criterion, then the taskmate module 116 adds (at 410) the trouble ticket 202 and the associated TC/AC combination 208 to the watch list 302. In response to populating the watch list 302 with the trouble ticket 202 and the associated TC/AC combination 208, the taskmate module 116 determines (at 406) whether the WFA system 204 includes any other trouble tickets 202. If the WFA system 204 includes other trouble tickets 202, then the taskmate module 116 retrieves (at 402) another trouble ticket 202 and the associated TC/AC combination 208 from the WFA system 204. If the WFA system 204 does not include other trouble tickets 202, then the method 400 terminates (at 408).

A service provider utilizing the watch list 302 may access a performance monitoring ("PM") of circuits associated with the watch list 302 at a given interval to determine whether any of circuits associated with the trouble tickets 202 on the watch list 302 are experiencing any problems or a failure. For example, the service provider may access the circuits associated with the trouble tickets on the watch list 302 to determine a performance quality value ("PQV") based on a number of errors at the circuit over a given amount of time. If the PQV indicates that the circuit is operating at less than a certain threshold, such as 100%, the service provider may proactively resolve the errors occurring at the circuit before the customer or other end user experiences or notices any service-related problems. By automatically populating the watch list 302 with trouble tickets 202 associated with circuits and monitoring those circuits, information technicians 206 may no longer be needed to manually access the PM of the circuits, resulting in a significant reduction in labor as well as an increase in efficiency.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for populating a watch list with circuits of a communications network to be monitored for repeat failures, comprising:
retrieving a trouble ticket associated with one of the circuits and a trouble code and analysis code (TC/AC) combination associated with the trouble ticket;
determining whether the trouble ticket meets a watch list criterion; and
in response to determining that the trouble ticket meets the watch list criterion, adding the trouble ticket and the TC/AC combination to the watch list.

2. The method of claim 1, wherein determining whether the trouble ticket meets a watch list criterion comprises determining whether TC/AC combination meets the watch list criterion.

3. The method of claim 2, wherein the TC/AC combination indicates a greater likelihood of a failure at a copper plant or facility due to repeat failures of the circuit.

4. The method of claim 1, further comprising:
accessing the circuit associated with the trouble ticket in the watch list at a given interval to monitor problems or a failure at the circuit.

5. The method of claim 1, wherein the trouble ticket and the TC/AC combination are retrieved from a work and force administration (WFA) system.

6. The method of claim 1, wherein the watch list is a database included within an integrated network controller.

7. The method of claim 1, wherein the trouble ticket and the TC/AC combination are maintained on the watch list for a given amount of time.

8. A system for populating a watch list with circuits of a communications network to be monitored for repeat failures, comprising:
a memory for storing a program containing code for populating a watch list with circuits to be monitored for repeat failures;
a processor functionally coupled to the memory, the processor being responsive to computer-executable instructions contained in the program and operative to:
retrieve a trouble ticket associated with one of the circuits and a trouble code and analysis code (TC/AC) combination associated with the trouble ticket, determine whether the trouble ticket meets a watch list criterion, and in response to determining that the trouble ticket meets the watch list criterion, add the trouble ticket and the TC/AC combination to the watch list.

9. The system of claim 8, wherein to determine whether the trouble ticket meets a watch list criterion, the processor is further operative to determine whether TC/AC combination meets the watch list criterion.

10. The system of claim 9, wherein the TC/AC combination indicates a greater likelihood of a failure at a copper plant or facility due to repeat failures of the circuit.

11. The system of claim 8, wherein the processor is further operative to access the circuit associated with the trouble ticket in the watch list at a given interval to monitor problems or a failure at the circuit.

12. The system of claim 8, wherein the trouble ticket and the TC/AC combination are retrieved from a work and force administration (WFA) system.

13. The system of claim 8, wherein the watch list is a database included within an integrated network controller.

14. A computer-readable medium having instructions stored thereon for execution by a processor to perform a method for populating a watch list with circuits of a communications network to be monitored for repeat failures, the method comprising:

retrieving a trouble ticket associated with one of the circuits and a trouble code and analysis code (TC/AC) combination associated with the trouble ticket;

determining whether the trouble ticket meets a watch list criterion; and in response to determining that the trouble ticket meets the watch list criterion, adding the trouble ticket and the TC/AC combination to the watch list.

15. The computer-readable medium of claim 14, wherein determining whether the trouble ticket meets a watch list criterion comprises determining whether TC/AC combination meets the watch list criterion.

16. The computer-readable medium of claim 15, wherein the TC/AC combination indicates a greater likelihood of a failure at a copper plant or facility due to repeat failures of the circuit.

17. The computer-readable medium of claim 14, the method further comprising:

accessing the circuit associated with the trouble ticket in the watch list at a given interval to monitor problems or a failure at the circuit.

18. The computer-readable medium of claim 14, wherein the trouble ticket and the TC/AC combination are retrieved from a work and force administration (WFA) system.

19. The computer-readable medium of claim 14, wherein the watch list is a database included within an integrated network controller.

20. The computer-readable medium of claim 14, wherein the trouble ticket and the TC/AC combination are maintained on the watch list for a given amount of time.

* * * * *